United States Patent [19]

Lin

[11] Patent Number: 5,590,769
[45] Date of Patent: Jan. 7, 1997

[54] INDIVIDUAL CD CASE

[76] Inventor: Shi-Ping Lin, No. 86, Lane 284, Gong-zhen Road, Luodong, Yilan Hsien, Taiwan

[21] Appl. No.: 618,551

[22] Filed: Mar. 20, 1996

[51] Int. Cl.$^6$ ................................ B65D 85/57
[52] U.S. Cl. ................ 206/308.1; 206/309; 206/815
[58] Field of Search .................. 206/308.1, 307, 206/309, 310, 311, 312, 313, 815

[56] References Cited

U.S. PATENT DOCUMENTS

| | | | |
|---|---|---|---|
| 4,463,849 | 8/1984 | Prusak et al. | 206/308.1 X |
| 5,011,010 | 4/1991 | Francis et al. | 206/309 X |
| 5,360,107 | 11/1994 | Chasin et al. | 206/313 |
| 5,505,299 | 4/1996 | Ditzig et al. | 206/308.1 |

Primary Examiner—Jacob K. Ackun
Attorney, Agent, or Firm—Beveridge, DeGrandi, Weilacher & Young, L.L.P.

[57] ABSTRACT

An individual CD case which includes a rectangular case body having a front open side and two opposing locating grooves near the front open side, a sliding plate slidably inserted into the front open side of the case body and retained inside the case body by forcing two headed retainer strips thereof into engagement with the locating grooves of the case body, the sliding plate having springs at the back side which automatically force the sliding plate out of the case body when the sliding plate is depressed and then immediately released, and a CD holder plate mounted on the sliding plate and having a keeper for holding down an individual compact disk.

4 Claims, 6 Drawing Sheets

5,590,769

INDIVIDUAL CD CASE

BACKGROUND OF THE INVENTION

The present invention relates to individual CD cases, and relates more particularly to such an individual CD case which is comprised of a case body, a sliding plate mounted in the case body, and a CD holder plate mounted on the sliding plate and, which automatically ejects the sliding plate and the CD holder plate out of the case body when the sliding plate is depressed and then immediately released.

Regular individual CD cases are commonly made of rectangular shape comprised of a bottom shell, a top cover shell pivoted to the bottom shell, and a CD holder plate mounted within the bottom shell. The bottom shell has two pivot holes bilaterally disposed near one end, and two raised portions bilaterally disposed near an opposite end. The top cover shell has two pivot pins bilaterally disposed at an inner side near one end and respectively inserted into the pivot holes of the bottom shell, and two recessed portions bilaterally disposed near an opposite end for engagement with the raised portions of the bottom shell when the individual CD case is closed. This structure of individual CD case is not satisfactory in function. When several individual CD cases are used, they cannot be arranged in good order. If to keep a big number of individual CD cases in order, a CD storage case or like means shell be used. Another drawback of this structure of individual CD case is that the user must use both hands when to pick up the compact disk from the case, i.e., the user must hold the case with one hand and remove the compact disk from the CD holder plate with the other hand. Another drawback of this structure of individual CD case is that the top cover shell cannot be easily opened from the bottom shell, and the case tends to be damaged when to open the top cover shell from the bottom shell with force. Furthermore, this structure of individual CD case is fragile, and tends to break when drops to the floor.

SUMMARY OF THE INVENTION

The present invention has been accomplished to provide an individual CD case which eliminates the aforesaid drawbacks. It is one object of the present invention to provide an individual CD case which can be easily and positively opened for the loading or removal of the compact disk. It is another object of the present invention to provide an individual CD case which is durable in use. It is still another object of the present invention to provide an individual CD case which allows the user to pick up the compact disk from the CD holder plate with one hand. It is still another object of the present invention to provide an individual CD case which allows the user to arrange a plurality of individual CD cases in good order.

According to one aspect of the present invention, the individual CD case comprises a rectangular case body having a front open side and two opposing locating grooves near the front open side, a sliding plate slidably inserted into the front open side of the case body and retained inside the case body by forcing two headed retainer strips thereof into engagement with the locating grooves of the case body, the sliding plate having springs at the back side which automatically force the sliding plate out of the case body when the sliding plate is depressed and then immediately released, and a CD holder plate mounted on the sliding plate and having a keeper for holding down an individual compact disk. According to another aspect of the present invention, a plurality of plug holes are respectively made on the top and bottom walls of the case body for the mounting of connecting elements so that a plurality of individual CD cases can be connected in a stack by the connecting elements.

DETAILED DESCRIPTION OF THE PREFERRED EMBODIMENT

Figure 1:
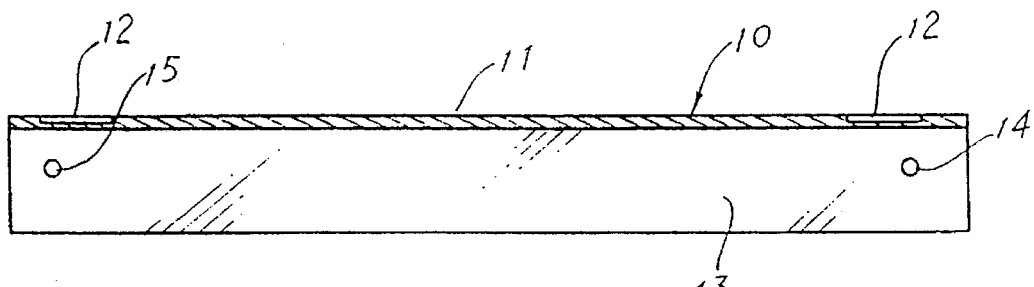
FIG. 1 is a side view in section of a top cover shell according to the present invention.
Figure 2:
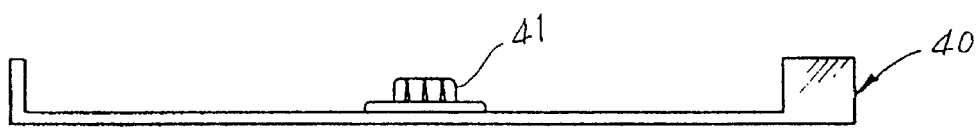
FIG. 2 is a side view in section of a CD holder plate according to the present invention.
Figure 3:
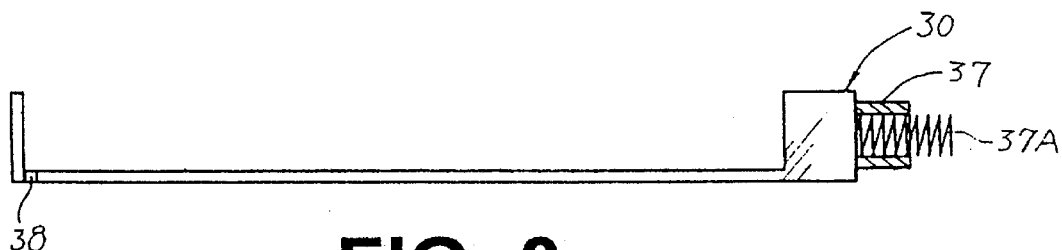
FIG. 3 is a side view in section of a sliding plate according to the present invention.
Figure 4:
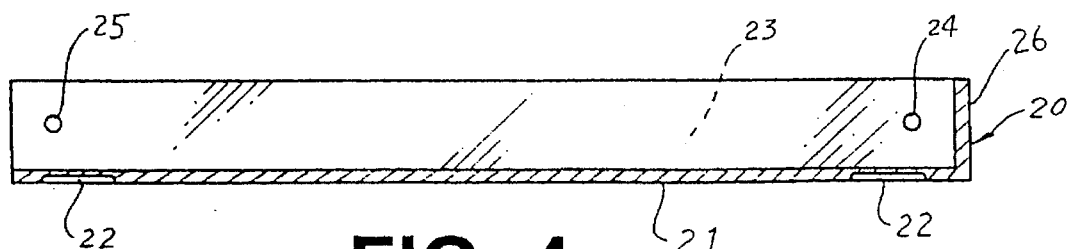
FIG. 4 is a side view in section of a bottom shell according to the present invention.
Figure 1A:
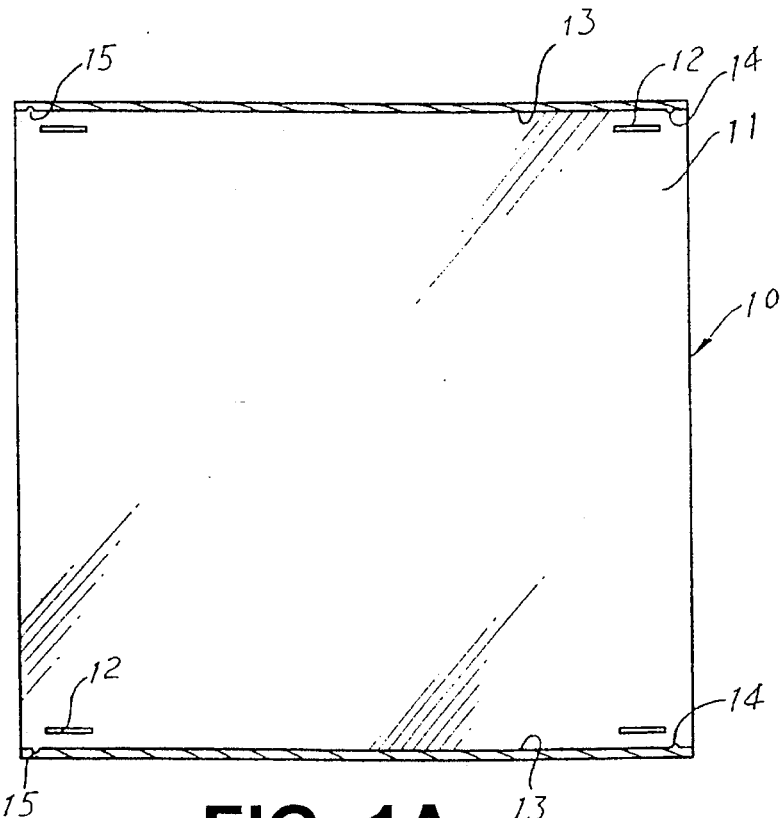
FIG. 1A is a top view of the top cover shell shown in FIG. 1.
Figure 4A:
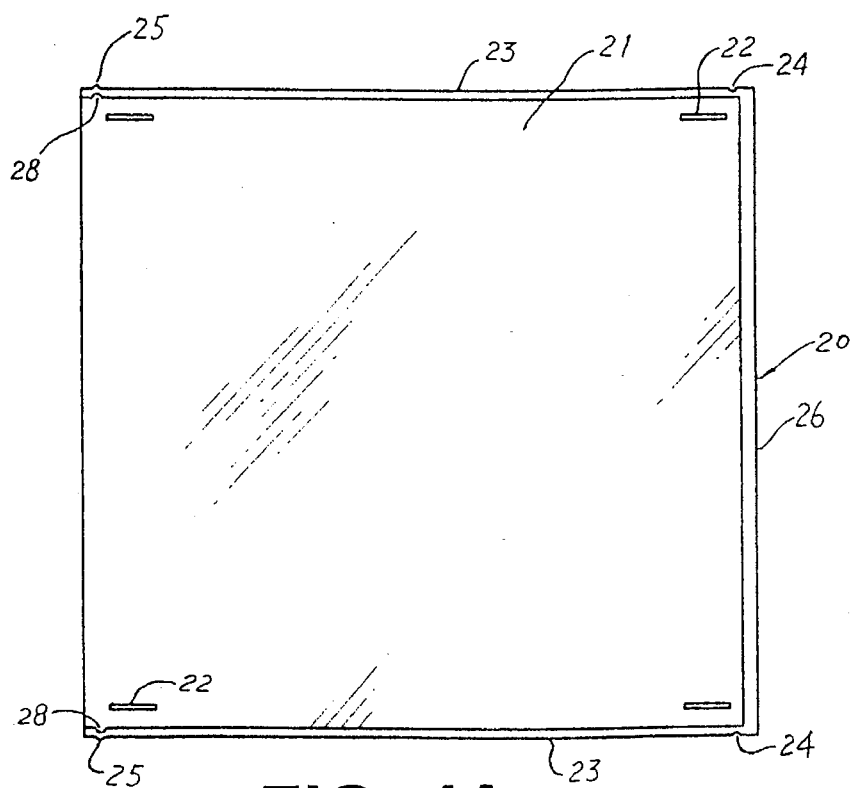
FIG. 4A is a top view of the bottom shell shown in FIG. 4.
Figure 2A:
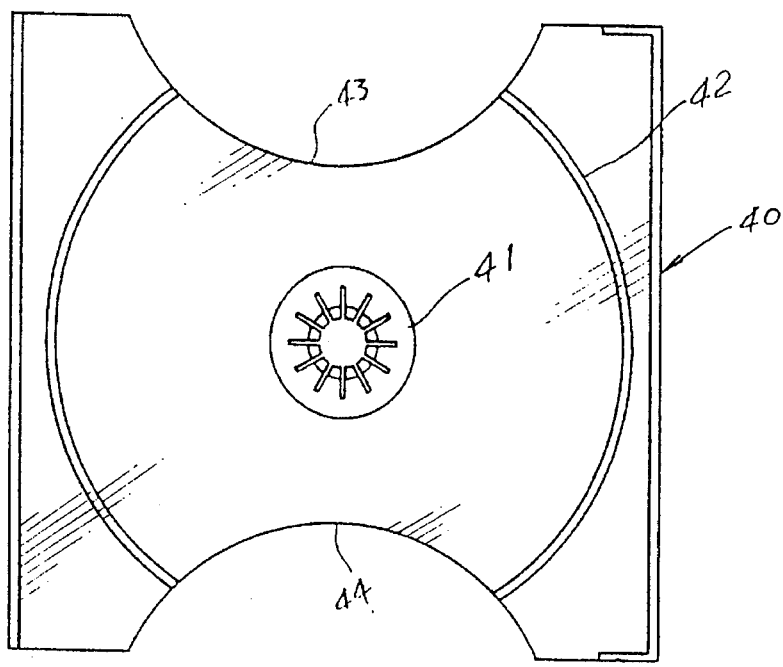
FIG. 2A is a top view of the CD holder plate shown in FIG. 2.

Referring to FIGS. from 1 to 4 and FIGS. 1A and 4A, an individual CD case in accordance with the present invention is generally comprised of a top cover shell 10 (see FIGS. 1 and 1A), a bottom shell 20 (see FIGS. 4 and 4A), a sliding plate 30 (see FIGS. 3 and 4) mounted within the bottom shell 20, and a CD holder plate 40 (see FIGS. 2 and 2A) mounted on the sliding plate 30.

Referring to FIGS. 1 and 1A again, the top cover shell 10 has a flat rectangular shape, a rectangular top wall 11, four elongated plug holes 12 in the four corners of the rectangular top wall 11, two opposing side walls 13 perpendicularly raised from the rectangular top wall 11 along the border, two raised portions 14 respectively raised from the vertical side walls 13 at an inner side near one end, and two recessed portions 15 respectively made on the vertical side walls 13 on the inside near an opposite end.

Referring to FIGS. 2 and 2A again, the CD holder plate 40 has two arched openings 43, 44 symmetrically disposed at two opposite sides, a keeper 41 raised from the center of the top side thereof, and an annular flange 42 raised from the top side around the keeper 41. The diameter of the annular flange 42 is slightly bigger than that of an individual compact disk so that an individual compact disk can be mounted on the keeper 41 at the top side of the CD holder plate 40 within the annular flange 42. The arched openings 43, 44 are for the insertion of the thumb and the forefinger to remove the individual compact disk from the keep 41.

Referring to FIGS. 4 and 4A again, the bottom shell 20 has a flat rectangular shape fitting the top cover shell 10, a rectangular bottom wall 21, four elongated plug holes 22 in the four corners of the rectangular bottom wall 21, two opposing side walls 23 perpendicularly raised from the rectangular bottom wall 21 along the border, an upright end wall perpendicularly raised from the rectangular bottom wall 21 and connected between the opposing side walls 23, two recessed portions 24 respectively made on the vertical side walls 23 at an outer side near one end, two raised portions 25 respectively raised from the vertical side walls 23 on the outside near an opposite end, and locating grooves 28 respectively made on the vertical side walls 23 on the inside opposite to the raised portions 25.

Figure 3A:
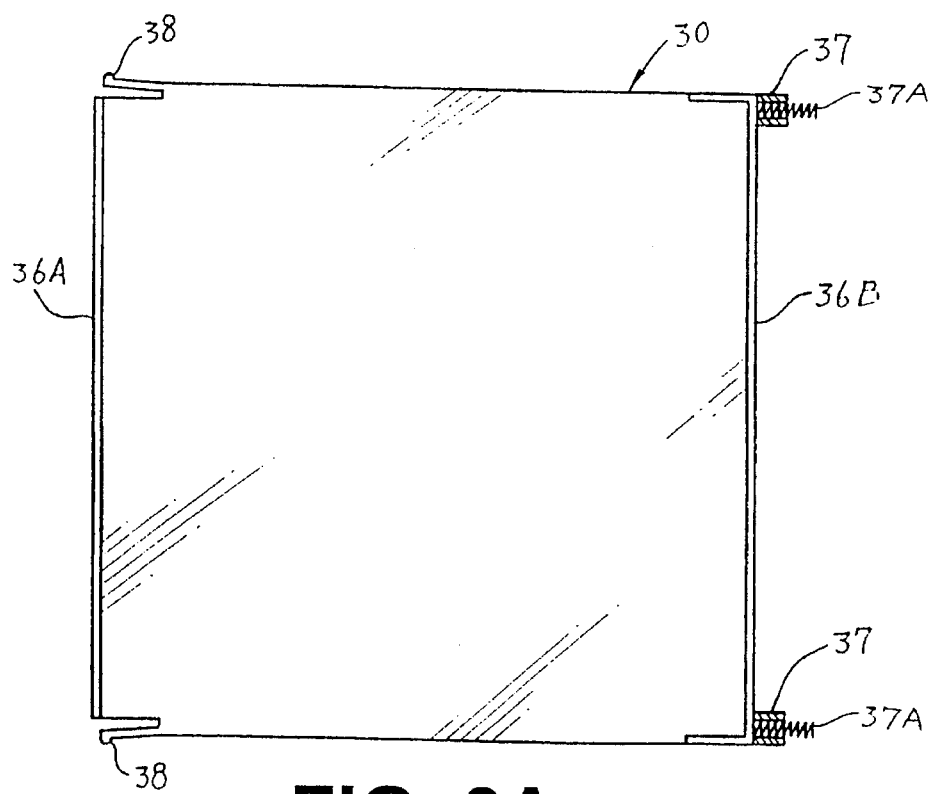
FIG. 3A is a top view of the sliding plate shown in FIG. 3.
Figure 5:
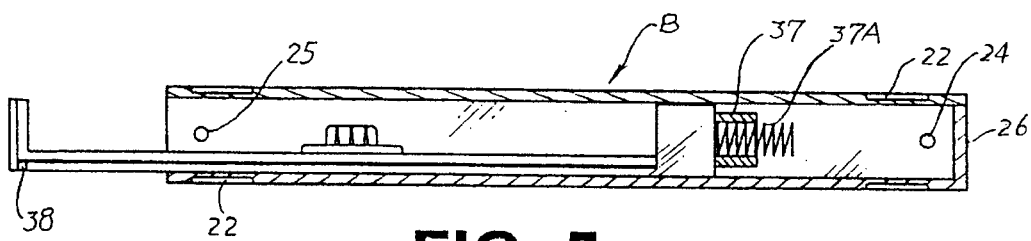
FIG. 5 is a side view in section of the individual CD case according to the present invention, showing the sliding plate partially extended out of the case body.

Referring to FIGS. 3 and 3A again, the sliding plate 30 has a rectangular shape fitting the bottom shell 20, two opposing upright end walls, namely, the left upright end wall 36A and the right upright end wall 36B, two spring holders 37 at two opposite ends of the right upright end wall 36B, two springs 37A respectively mounted in the spring holders 37, and two headed retainer strips 38 respectively projecting from two opposing sides adjacent to the two opposite ends of the left upright end wall 36A for engagement with the locating grooves 28. The right upright side wall 36B has a substantially C-shaped profile.

Figure 6:
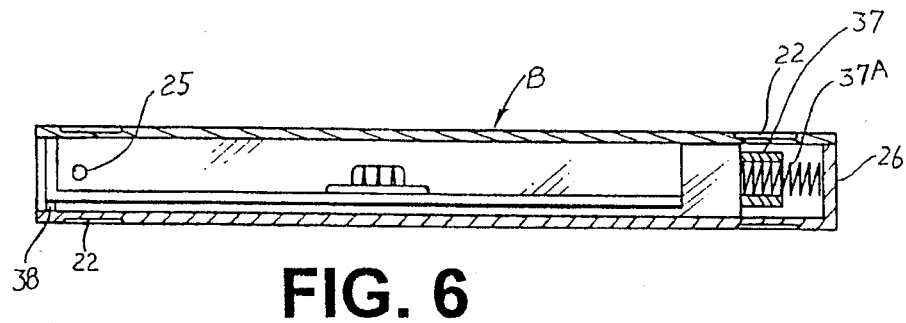
FIG. 6 is similar to FIG. 5 but showing the sliding plate retained inside the case body.
Figure 5A:
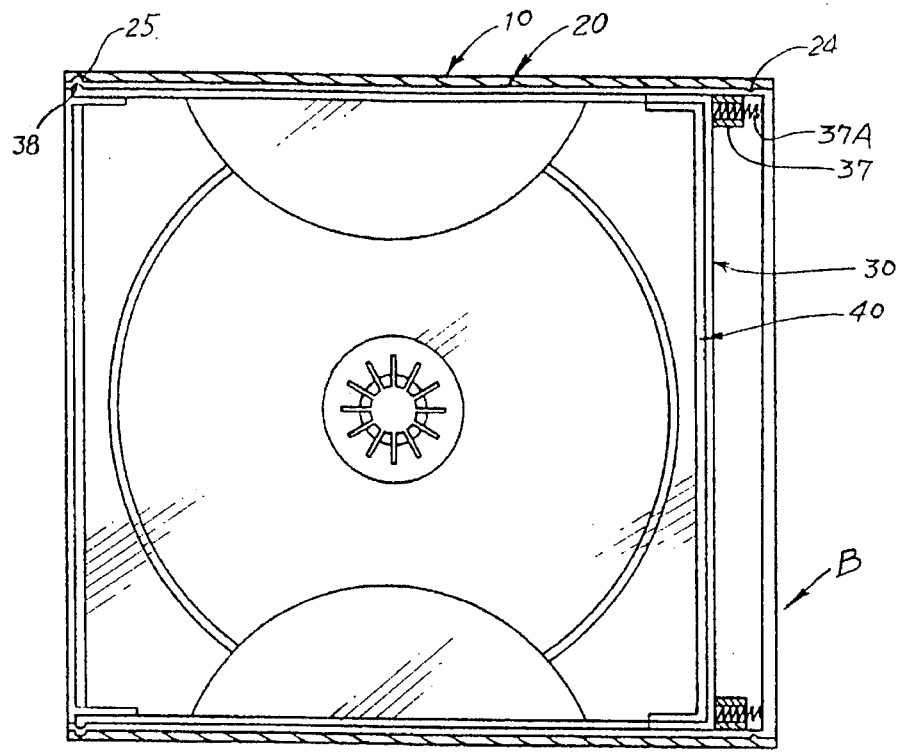
FIG. 5A is a top plain view of FIG. 5.
Figure 6A:
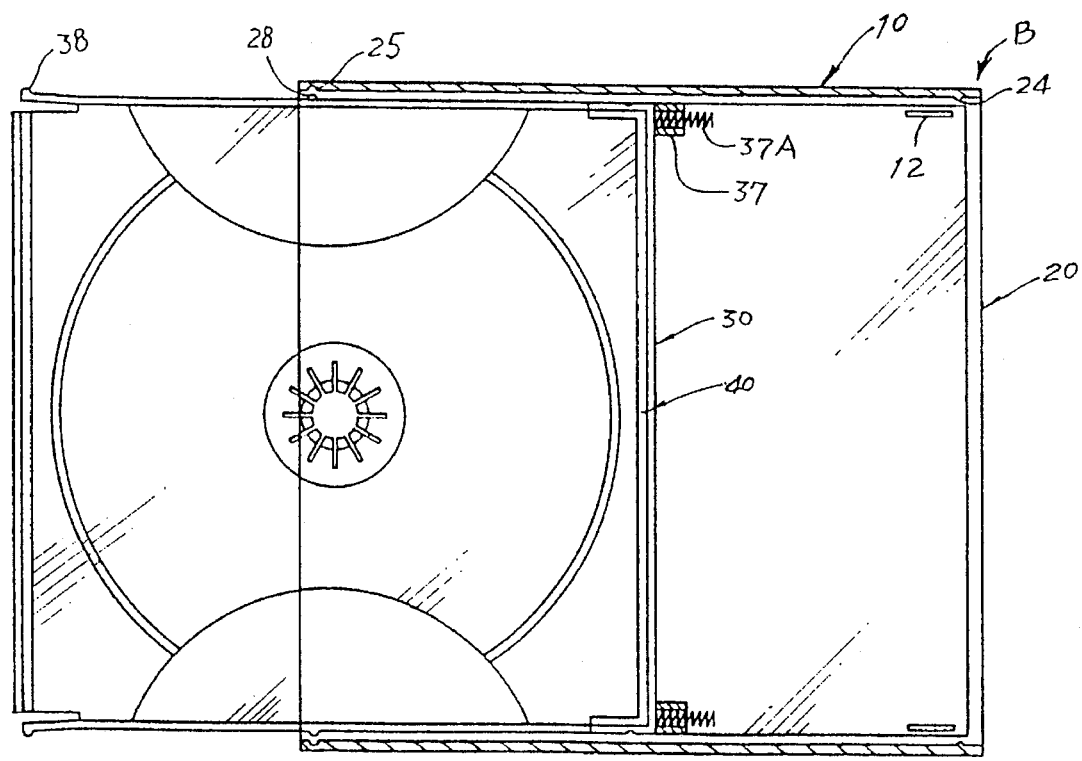
FIG. 6A is a top plain view of FIG. 6.

The assembly process of the individual CD-case is outlined hereinafter with reference to FIGS. 6 and 6A, and FIGS. 5 and 5A again. The CD holder plate 40 is mounted on the sliding plate 30. The top cover shell 10 is covered on the bottom shell 20, permitting the recessed portions 15 to be respectively forced into engagement with the raised portions 25 and the raised portions 14 to be forced into engagement with the recessed portions 24. Before the installation of the CD holder plate 40 in the sliding plate 30, the brochure is put in the sliding plate 30. When the CD holder plate 40 is mounted within the sliding plate 30 to hold down the brochure, the sliding plate 30 with the CD holder plate 40 are then inserted into the case body B formed of the top cover shell 10 and the bottom shell 20, permitting the headed retainer strips 38 to be respectively forced into engagement with the locating grooves 28.

Referring to FIGS. 5 and 5A again, when the sliding plate 30 is forced inwards to compress the springs 37A, the headed retainer strips 38 are simultaneously forced away from the constraint of the locating grooves 28, therefore the springs 37A immediately force the sliding plate 30 outwards upon release of the hand from the sliding plate 30, causing the sliding plate 30 to partially project out of the case body B. When the sliding plate 30 partially projects out of the case body B, the user can pull the sliding plate 30 out of the case body B, then put the compact disk on the CD holder plate 40 or remove the compact disk from the CD holder plate 40, or pick up the brochure from the sliding plate 30. On the contrary, when the sliding plate 30 is inserted into the case body B, the headed retainer strips 3 8 are forced into engagement with the locating grooves 28, and the sliding plate 30 is retained inside the case body B.

Figure 7:
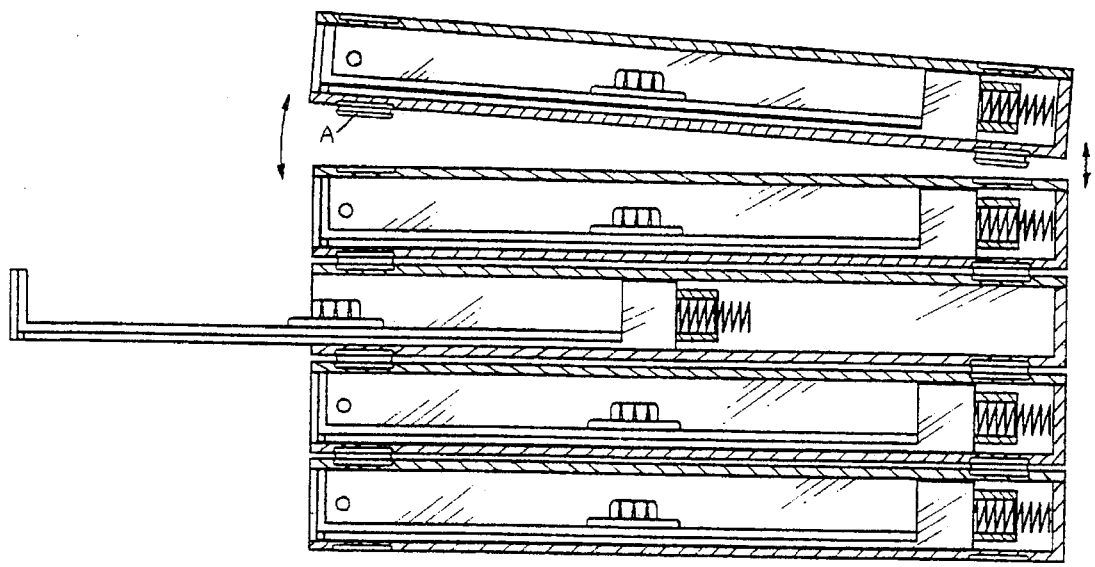
FIG. 7 is an applied view of the present invention, showing a set of CD cases connected in a stack.
Figure 7A:
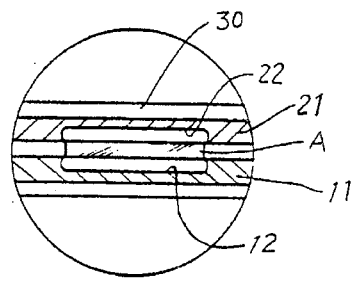
FIG. 7A is an enlarged view of a part of FIG. 7, showing one connecting element connected between two case bodies.
Figure 8:
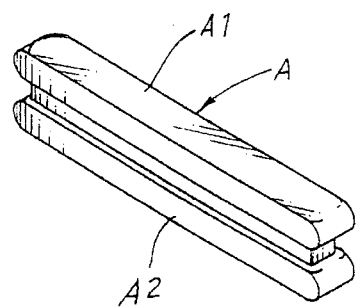
FIG. 8 is an elevational view of the connecting element according to the present invention.

Referring to FIGS. 7, 7A, and 8, connecting elements A can be fastened to the plug holes 12 of the top cover shell 10 and the plug holes 22 of the bottom shell 20 to connect a plurality of case bodies B in a stack. As illustrated in FIG. 8, the connecting element A has a substantially I-shaped profile, a top flange A1 and a bottom flange A2 joined by a neck between. The top flange A1 and the bottom flange A2 are respectively fitted in one plug hole 22 on the bottom wall 21 of the bottom shell 20 of one case body and the corresponding plug hole 12 of the top wall 11 of the top cover shell 10 of the adjacent case body below.

It is to be understood that the drawings are designed for purposes of illustration only, and are not intended as a definition of the limits and scope of the invention disclosed.

What the invention claimed is:

1. An individual CD case comprising:

a case body formed of a bottom shell and a top cover shell covered on said bottom shell, said case body having a pair of opposing side walls, a top wall, a bottom wall, a back wall, and a front opening, said opposing side walls having a respective locating groove at an inner side adjacent to said front opening;

a sliding plate slidably inserted into the front opening of said case body and retained inside said case body, said sliding plate having two headed retainer strips projecting from two opposite sides thereof and spring means at a rear end thereof, said headed retainer strips being respectively forced into engagement with the locating grooves of said case body to hold said sliding plate inside said case body when said sliding plate is inserted into the front opening of said case body, said spring means being stopped at the back wall of said case body and compressed when said sliding plate is retained inside said case body; and a CD holder plate mounted on said sliding plate, said CD holder plate having two arched openings symmetrically disposed at two opposite sides, a top side, and a keeper raised from the center of the top side for holding down an individual compact disk on the top side of said CD holder plate.

2. The individual CD case of claim 1 wherein said spring means comprises two spring holders respectively and bilaterally disposed at the rear end of said sliding plate, and two springs respectively installed in said spring holders.

3. The individual CD case of claim 1 further comprising a plurality of plug holes respectively made on the top and bottom walls of said case body, and a plurality of connecting elements for fitting into said plug holes for permitting a number of individual CD cases to be connected in a stack.

4. The individual CD case of claim 3 wherein each of said connecting elements has a top flange, a bottom flange, and a neck connected between said top flange and said bottom flange.

\* \* \* \* \*